United States Patent [19]

Lichti et al.

[11] Patent Number: 4,640,711
[45] Date of Patent: * Feb. 3, 1987

[54] METHOD OF OBJECT CONSOLIDATION EMPLOYING GRAPHITE PARTICULATE

[75] Inventors: Wayne P. Lichti, Lakewood; Alfred F. Hofstatter, Dana Point, both of Calif.

[73] Assignee: Metals Ltd., Newport Beach, Calif.

[*] Notice: The portion of the term of this patent subsequent to Sep. 3, 2002 has been disclaimed.

[21] Appl. No.: 732,683

[22] Filed: May 10, 1985

Related U.S. Application Data

[63] Continuation-in-part of Ser. No. 535,791, Sep. 26, 1983, Pat. No. 4,539,175.

[51] Int. Cl.⁴ ............................................. B22F 1/00
[52] U.S. Cl. ........................................ 75/248; 75/228; 264/65; 264/125; 264/332; 264/500; 264/572; 264/DIG. 36; 264/DIG. 50; 419/23; 419/31; 419/44; 419/49
[58] Field of Search ............... 419/48, 44, 49, 31, 419/42, 23, 68; 264/332, 65, 56, 125, 500, 572, DIG. 36, DIG. 50; 75/248

[56] References Cited

U.S. PATENT DOCUMENTS

| | | | |
|---|---|---|---|
| 3,356,496 | 12/1967 | Hailey | 75/226 |
| 3,556,780 | 1/1971 | Holtz, Jr. | 75/203 |
| 3,689,259 | 9/1972 | Hailey | 175/226 |
| 3,746,518 | 7/1973 | Holtz, Jr. | 29/182.7 |
| 4,227,927 | 10/1980 | Black et al. | 419/60 |
| 4,499,048 | 2/1985 | Hanejko | 419/49 |
| 4,518,441 | 5/1985 | Hailey | 419/48 |
| 4,539,175 | 9/1985 | Lichti et al. | 419/8 X |

Primary Examiner—Stephen J. Lechert, Jr.
Attorney, Agent, or Firm—William W. Haefliger

[57] ABSTRACT

The method of consolidating a metallic, metallic and ceramic, or ceramic body in any of initially powdered, sintered, fibrous, sponge, or other form capable of compaction, includes the steps:
(a) providing a bed of flowable particles within a contained zone, said particulate primarily including flowable and resiliently compressible carbonaceous particles,
(b) positioning said body in said bed,
(c) and effecting pressurization of said bed to cause pressure transmission via said particles to said body, thereby to compact the body into desired shaped, increasing its density,
(d) said body and bed being at elevated temperatures prior to said pressurization step.

37 Claims, 14 Drawing Figures

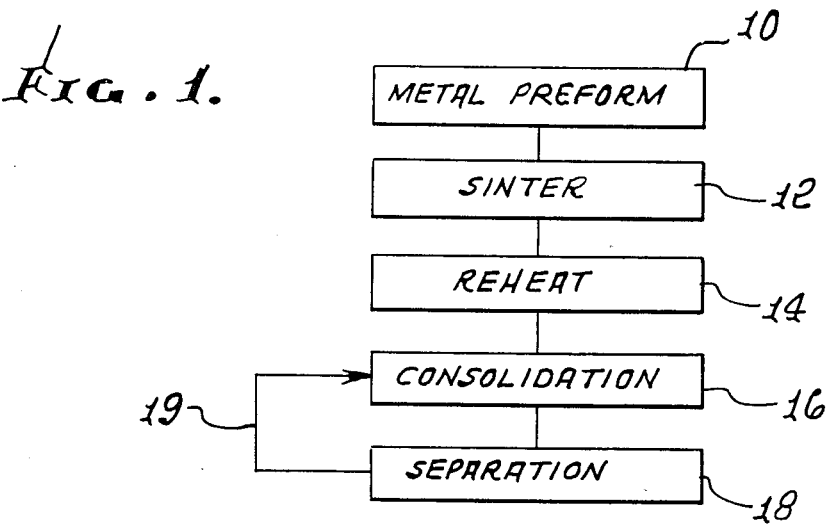
Fig. 1.
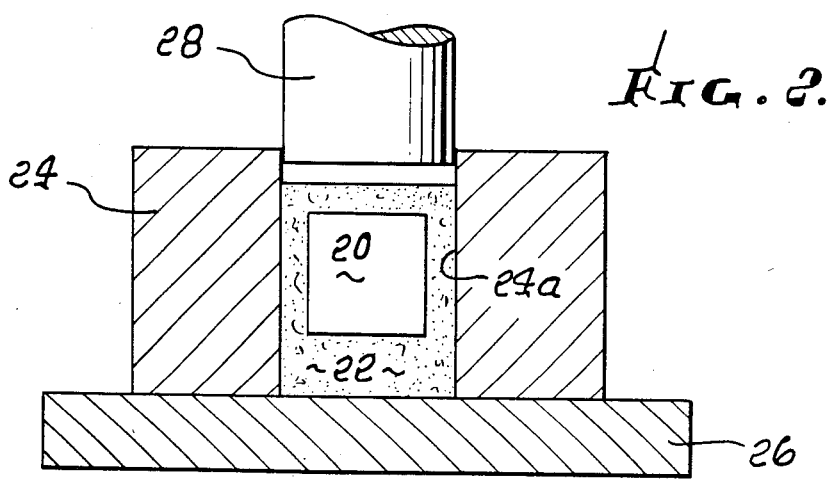
Fig. 2.
Fig. 3.
Fig. 4.

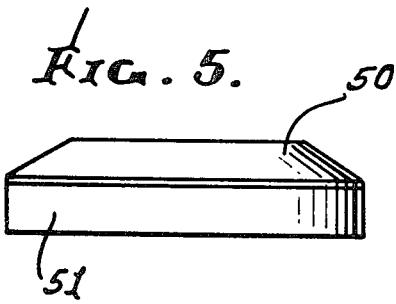
FIG. 5.
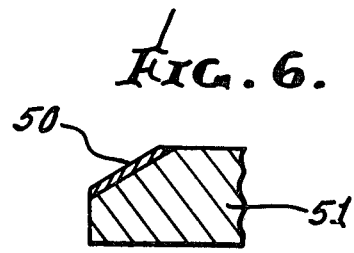
FIG. 6.
FIG. 7. "PRIOR ART"
100 X
S.E.M.
FIG. 8. "PRIOR ART"

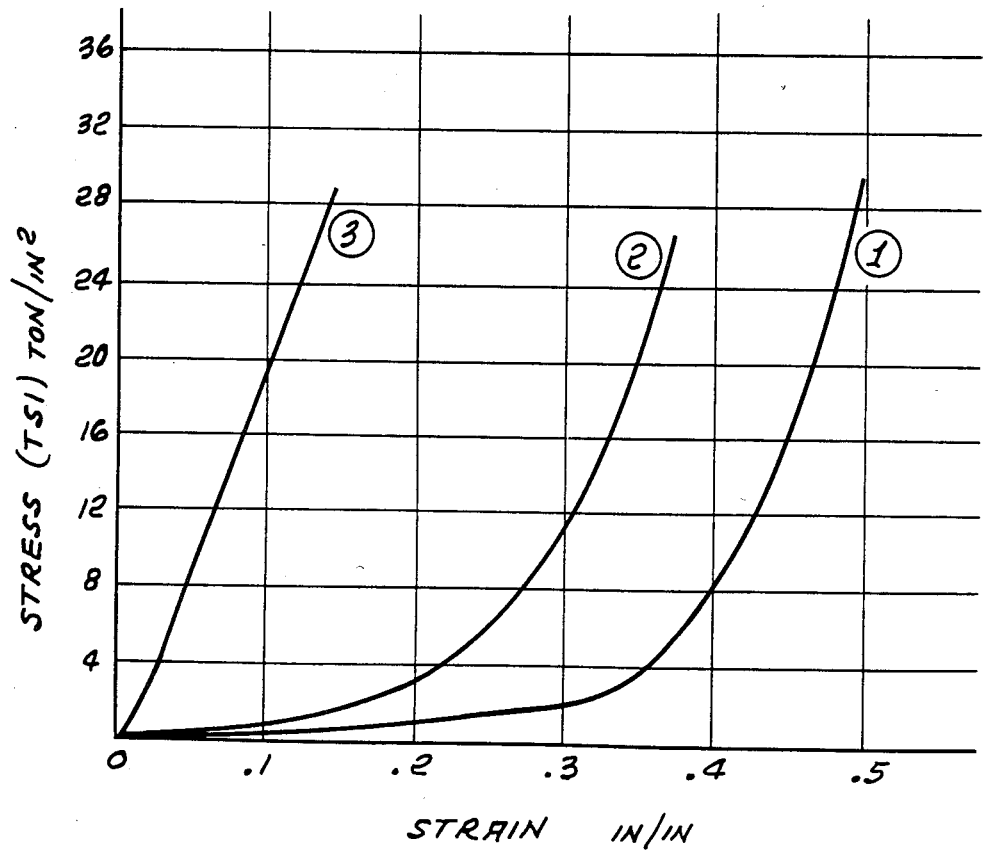

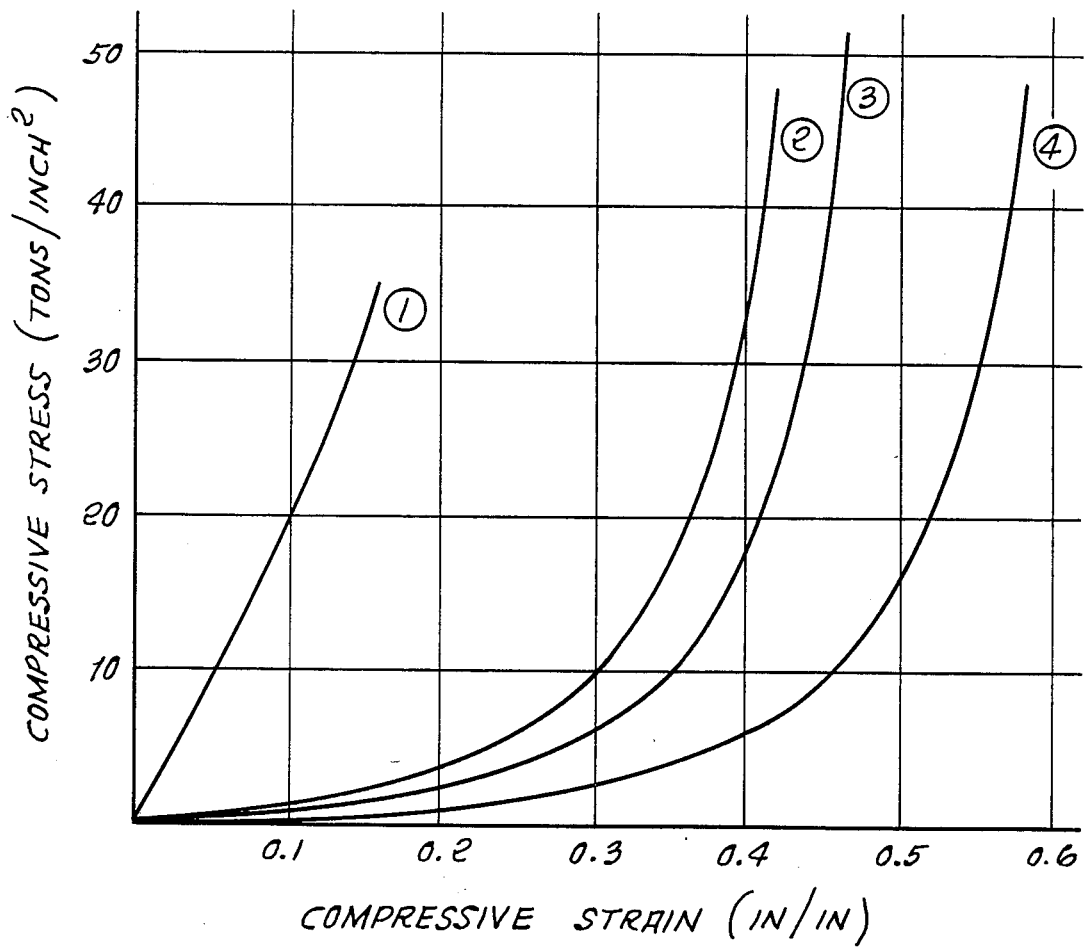

METHOD OF OBJECT CONSOLIDATION EMPLOYING GRAPHITE PARTICULATE

This application is a continuation-in-part of Ser. No. 535,791, filed Sept. 26, 1983, now U.S. Pat. No. 4,539,175.

1. FIELD OF THE INVENTION

This invention relates to the field of consolidating bodies, and more specifically, to an improved method which enables complex metallic or ceramic bodies to be made with minimal distortion, to near net shape.

2. PRIOR ART

Methodology associated with producing high density metallic objects by consolidation is recognized in the prior art. Exemplars of prior art references which discuss such methodology are U.S. Pat. Nos. 3,356,496 and 3,689,259. Prior to discussing these references, a brief discussion will be set forth which illustrates the two primary methodologies currently used to densify either loose powder or a prepressed metal powder compact. These two techniques are generally referred to as Hot Isostatic Pressing and Powder Forging. The Hot Isostatic Pressing ("HIP") process comprises placing loose metal powder or a prepressed compact into a metal can or mold, and subsequently evacuating the atmopshere from the can, sealing the can to prevent any gases from re-entering, and placing the can in a suitable pressure vessel. The vessel has internal heating elements to raise the temperature of the powder material to a suitable consolidation temperature. Internal temperatures of 1000° C. to 2100° C. are typically used depending upon the material being processed. Coincident with the increase in the internal temperature of the HIP vessel, the internal pressure is slowly increased and maintained at from 15,000 to about 30,000 psi, again depending upon the material being processed. Under the combined effects of temperature and isostatic pressure, the powder is densified to the theoretical bulk density of the material. A HIP vessel can accept more than one can during a given cycle and thus there is the ability to densify multiple powdered metal articles per cycle. In addition, by the use of isostatic pressure, the densification is more or less uniform throughout the formed article. By the use of suitable can design, it is possible to form undercuts for transverse holes or slots in the densified article. However, the cycle time of the charge is slow, often requiring 8 hours or longer for a single cycle. Further, at the completion of the cycle, the cans surrounding the powdered metal articles have to be either machined off or chemically removed. The second common method of densifying powdered metal is a technique referred to as Powder Forging ("PF"). The Powder Forging process comprises the steps of:

(a) cold compacting loose metal power at room temperature in a closed die at pressures in the range of 1-50 TSI into a suitable geometry (often referred to as a "preform") for subsequent forging. At this state, the preform is friable and may contain 20-30 percent porosity and its strength is derived from the mechanical interlocking the powdered particles.

(b) sintering the preform (i.e. subjecting the preform to an elevated temperature at atmospheric pressure) under a protective atmopshere. Sintering causes solid state "welding" of the mechanically interlocked powdered particles.

(c) reheating the preform to a suitable forging temperature (depending upon the alloy). Alternately this reheating step may be incorporated into the sintering step.

(d) forging the preform in a closed die into the final shape. The die is typically maintained at a temperature of about 300° F. to 600° F.

The forging step eliminates the porosity inherent from the preforming and gives the final shape to the PF part.

Advantages of Powder Forging include: speed of operation (up to 1000 pieces per hour); ability to produce a net shape; mechanical properties substantially equivalent to those of conventionally forged products; and increased material utilization. However, there are number of disadvantages including nonuniformity of density because of chilling of the preform when in contact with the relatively cold die, draft required on sides and walls, and the inability to form undercuts which can be done in HIP.

The patents mentioned above disclose what appears to be a combination of isothermal and isostatic conditions of HIP and HIP's ability to form undercuts, with the high speed, low cost continuous production normally associated with Powder Forging. In the '496 patent, the use of a cast ceramic outer container is taught as the primary heat barrier. In addition, this cast ceramic outer container when deformed causes nearly uniform distribution of pressure on the powdered material.

In the '259 patent the use of granular refractory materials is taught. This reference is intended as an improvement over the earlier '496 patent in relation to faster heating of the grain, and faster heating of the prepressed part.

While the '496 and '259 patents may represent advances in the art, significant problems remain with respect to the use of a bed of ceramic into which a preform is typically placed prior to consolidation. More specifically, it has been found that the use of crushed and ground ceramics or carbides results in a significantly non-uniform pressure distribution from the top of the charge (the surface against the moving press member) to the bottom of the charge (the surface against the fixed press bed). This non-uniformity of pressure distribution is readily demonstrated when consolidating a prepressed right circular cylinder of a powdered material. After consolidation in a bed of crushed and ground or fused ceramic material to nearly 100% of bulk density, it was determined that the surface of the prepressed cylinder nearest the moving press ram was smaller in diameter than the surface nearest the fixed bed. Sectioning the consolidated cylinder along a diameter and examining the sectioned surface, indicated that it had the shape of a trapezoid. The above phenomena was observed in all consolidated articles when a crushed and ground or fused granular ceramic matrix was employed as the consolidation media.

The solution to the problems associated with such distortion and lack of dimentional stability in shape has proved illusive, especially when the solution must also be applicable to mass production. The present invention provides a solution which is adaptable to mass production.

SUMMMARY OF THE INVENTION

It is a major object of the invention to provide a method or methods of consolidating method, metal and ceramic, or ceramic bodies which obviate the above described as well as additional problems and difficulties. Basically, the method of the invention is applicable to such bodies in any of initially powdered, sintered, fibrous, sponge or other form capable of compaction, and includes the steps:

(a) providing a bed of flowable particles within a contained zone, said particles primarily including flowable and resiliently compressible carbonaceous particles, (b) positioning the body in the bed, (c) and effecting pressurization of said bed to cause pressure transmission via said particle to said body, thereby to compact the body into desired shape, increasing its density.

As will appear, the carbon particles may with unusual advantage consist essentially of compressible beads, typically having nodules projecting outwardly at the bead surfaces, and the beads being especially effective when they consist of graphite and are generally spheroidal. In this regard, compaction is most advantageously carried out at elevated temperature of the body, i.e. at temperatures within the range 1700° F. to 4,000° F. Further the pressurization may be effected to resiliently compress the particulate closest to the body so that when the compacted body is removed from the bed the particulate closest to the body surface flows freely on that surface to minimize clean-up of the compacted body surface. Also, it is found that the use of carbonaceous particles or granules results in minimum agglomeration of theparticles, so that they remain free flowing and can be quickly re-cycled for re-use in a subsequent compaction operation. Petroleum coke particles are of unusual advantage.

A further aspect of the invention concerns the consolidation as referred to, of the body in the form of a metal layer on a carrier (cladding); and as will appear, that metal layer may consist of tungsten on a carrier consisting of molybdenum.

By the use of the methodology of the present invention, substantially improved structural articles of manufacture can be made having minimal distortion, as particularly enabled by the use of carbonaceous particulate in flowable form.

The novel features which are believed to be characteristic of this invention, both as to its organization and method of operation, together with further objectives and advantages thereof will be better understood from the following description considered in connection with the accompanying drawings in which a presently preferred embodiment of the invention is illustrated by way of example. It is to be expressly understood, however, that the drawings are for the purposes of illustration and description only and are not intended as a definition of the limits of the invention.

DRAWING DESCRIPTION

FIG. 1 is a flow diagram showing the method steps of the present invention;

FIG. 2 is a cut-away elevation showing the consolidation step of the present invention;

FIG. 3 is a plan view showing a consolidated article of manufacture which has been consolidated in a bed of alumina particles not of spheroidal shape;

FIG. 4 is a plan view showing a consolidated article of manufacture which has been consolidated in a bed of graphite particles;

FIG. 5 is a side elevation showing a body to be compacted, on a carrier;

FIG. 6 is a fragmentary vertical section taken through the FIG. 5 body;

FIG. 7 is a photographic enlargement of graphite bed particles; and FIG. 8 is a drawing of certain such particles;

FIGS. 9 and 10 are graphs;

DETAILED DESCRIPTION

Figure 11:
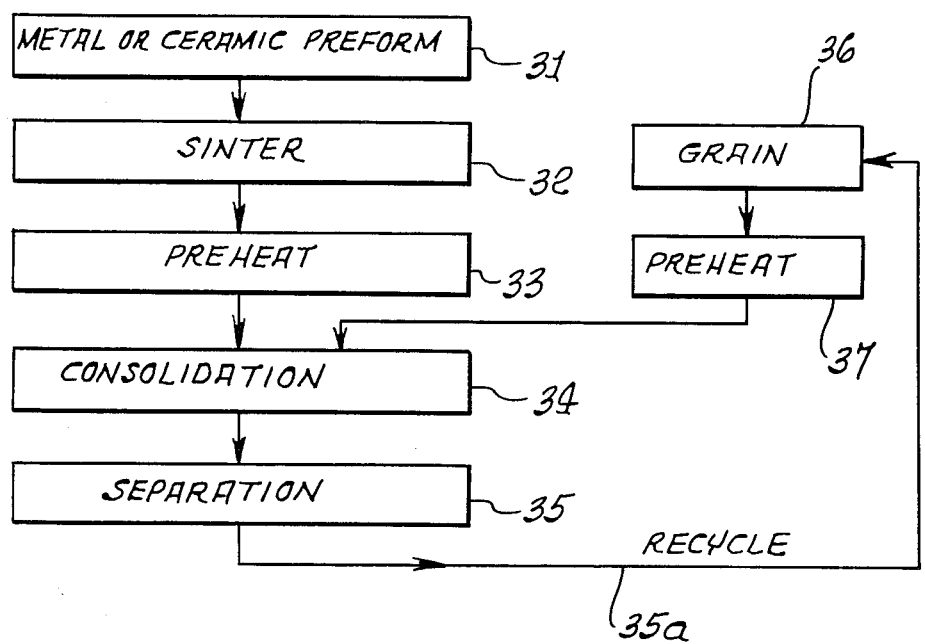
FIG. 11 is a flow diagram showing method steps.

Referring first to FIG. 1, there is shown a flow diagram illustrating the method steps of the present invention. As can be seen from numeral 10, initially a metal, metal and ceramic, or ceramic article of manufacture or preform is made, for example, in the shape of a wrench or other body. While the preferred embodiment contemplates the use of a metal preform made of powdered steel particles, other metals and ceramic materials such as alumina, silica and the like are also within the scope of the invention. A preform typically is about 85 percent of theoretically density. After the powder has been made into a preformed shape, it is typically subsequently sintered in order to increase the strength. In the preferred embodiment, the sintering of the metal (steel) preform requires temperatures in the range of about 2,000° to 2,300° F. for a time of about 2-30 minutes in a protective atmosphere. In the preferred embodiment such protective, non-oxidizing inert atmosphere is nitrogen-based. Subsequent to sintering, illustrated at 12, the preforms can be stored for later processing. Should such be the case, as illustrated at 14, the preform is subsequently reheated to approximately 1950° F. in a protective atmosphere.

The consolidation process, illustrated at 16, takes place after the hot preform has been placed in a bed of heated carbonaceous particles as hereinbelow discussed in greater detail. In order to generate the desired high quantity of production, alternating layers or beds of carbonaceous particles and hot preforms can be used. Further, in order to speed up production, consolidation can take place subsequent to sintering, so long as the preform is not permitted to cool. Consolidation takes place by subjecting the embedded preform to high temperature and pressure. For metal (steel) objects, temperatures in the range of about 2,000° F. and uniaxial pressures of about 40 TSI are used. Compaction at pressures of 10-60 TSI depending on the material are also within the scope of the present invention. The preform has now been densified and can be separated, as noted at 18, where the carbonacous particles separate readily from the preform and can be recycled as indicated at 19. If necessary, any particles adhering to the preform can be removed and the final product can be further finished.

As discusssed above, one problem associated with the use of a ceramic bed as that the final product suffered from distortion. Microscopic examination of such crushed and ground or fused granular ceramic materails indicate a highly irregular shape, with many individual particles having a cross-sectional appearance either rectangular or triangular. It was further determined that when using a bed of spheroidal ceramic particles, product distortion remained. Even though the use of such a bed produced articles of more dimensional stability as compared with the prior art, the need to improve such dimensional stability remained.

It has been discovered in accordance with the present invention that an unusual high degree of product dimensional stability is obtained when the bed primarily (and preferably substantially completely) consists of flowable carbonaceous particles. For best results, such particles are resiliently compressible graphite beads, and they have outward projecting nodules on and spaced apart on their generally spheroidally shaped outer surfaces, as well as surface fissures. See for example FIG. 8, showing certain particles 40 or granules as they also appear in the photographic reproduction of FIG. 7. Their preferred size is between 50 and 240 mesh. Useful granules are further identified as desulphurized petroleum coke. Such carbon or graphite particles have the following additional advantages in the process:

(1) They form easily around corners and edges, to distribute applied pressure essentially uniformly to and over the body being compacted. The particles suffer very minimal fracture, under compaction pressure.

(1a) The particles are not abrasive, therefore reduced scoring and wear of the die is achieved.

(2) They are elastically deformable, i.e. resiliently compressible under pressure and at elevated temperature, the particles being stable and usable up to 4,000° F.; it is found that the granules, accordingly, tend to separate easily from (i.e. do not adhere to) the body surface when the body is removed from the bed following compaction.

(3) The granules do not agglomerate, i.e. cling to one another, as a result of the body compaction process. Accordingly, the particles are readily recycles, for re-use, as at 19 in FIG. 1.

(4) The graphite particles become rapidly heated in response to AC induction heating, whereby the FIG. 1 step 4 may include or consist of such induction heating. The particles are stable and usable at elevated temperatures up to 4,000° F. Even though graphite oxidizes in air at temperatures over 800° F., short exposures as during cool-down, do not harm the graphite particles.

(5) The use of the graphite particle bed enables significant reduction (up to 40%) in compaction force application, as via piston 28 in FIG. 2, whereby the necessary size of the compaction equipment may be reduced.

Referring now to FIG. 2 the consolidation step is more completely illustrated. In the preferred embodiment, the preform 20 has been completely embedded in a bed of carbonaceous particles 22 as described, and which in turn have had placed in a contained zone 24a as in consolidation die 24. Press bed 26 forms a bottom platen, while hydraulic press ram 28 defines a top and is used to press down onto the particles 22 which distributes the applied pressure substantially uniformly to preform 20. The preform is at a temperature between 1000° F. and 4,000° F., prior to compaction (and preferably between 1,700° F. and 4,000° F.). The embedded metal powder preform 20 is rapidly compressed under high uniaxial pressure by the action of ram 28 in die 24.

As discussed above, use of ceramic particles produces non-uniform pressure distribution such that after consolidation a plan view of a cylinder 30a sectioned along a diameter would tend to have the shaped of a trapezoid as illustrated in FIG. 3. Referring now to FIG. 4, it is seen that the same prepressed right circular cylinder 30b when consolidated in a graphite bed 22 retained its original shape, i.e. the diameter remains substantially uniform from top to bottom. Thus, by the use of a graphite bed particulate, the need for further machining and/or redesigning of the preform is substantially eliminated.

FIGS. 5 and 6 show the body in the form of a metallic layer 50 on a carrier 51. As shown, the layer has frusto-conical shape and may consist of tungsten on a molybdenum carrier or base. The body is usable as an X-ray target, and it is found that densification of the tungsten, by compaction, substantially increases the useful life of the target, with corresponding savings in cost.

FIG. 9 depicts stress-strain curves for differenct volume percentages of mixed graphite particles and bauxite ceramic particles, in a bed. It will be noted that for a given applied stress, the strain (compressibility) of the bed increases with an increased percentage of graphite particles, and is greatest for an all graphite bed. Mixtures of graphite paricles and other carbonaceous or ceramic particles allows a tailoring of the characteristics of shape control on a body being consolidated.

In FIG. 7 the graphite granules are enlarged 100 times. Note also the fissures in many particles, which contribute to compressiblity.

It is also possible to employ a minor portion, by volume, of ceramic particles admixed with the carbonaceous particles in the bed 22. Such ceramic particles typically are within the size range 50–240 mesh, and may for example consist of bauxite.

Reference will now be made to modification as represented in FIGS. 10–14. As before, the invention provides a method of consolidating an object 20 of powder metal, ceramic, or composite of metals and/or ceramic by placing the object in carbonaceous particulate material 22 in a container 24 and pressurizing the particulate material, whereby the particulate material transmits the pressure to the ojbect in a pseudo isostatic manner. For example, the object 20 in FIG. 2 and particulate material (grain) 22 are typically heated to an elevated temperature in the range of 1,200° to 3,400° F.; the grain is then poured into a simple die cavity 24a, the part is placed into the grain in the proper orientation, and the grain is pressurized as by the action of a punch 28 in a hydraulic press to a pressure of 10 to 60 TSI and the object is consolidated to full density.

Referring to FIG. 11 which is a simple flow diagram of the modified process; the metal or ceramic preform or composite object is made by any conventional method 31, the only requirement being that the object has adequate green strength for handling. The preform is typically between 65% and 85% dense, the lower density being typical for preforms made from spherical powder particles and unfired ceramics. The preform is then sintered at 32 to improve its strength. The sintering of the metal or ceramic preform is performed at a temperature that depends on the material being processed, but will normally lie between 1,500° and 3,400° F. For ferrous alloys, temperatures between about 2,000° to 2,300° F. are typical, while for heat and wear resistant alloys and ceramics tempertures of between 2100°14 2300° F. and 2600°–3400° F., respectively are typical. Sintering times for metalic objects are typically from 5 to 60 minutes, depending on the preform size while ceramic usually require longer times. Atmospheres of inert or reducing gases are employed during the sintering cycle. Subsequent to sintering, the objects can be stored for later processing. When the objects are·to be consolidated employing the present method, they are reheated at 33 to temperatures in the same range as during sintering, also in a protective atmosphere. To conserve energy it is possible and desirable to consolidate the objects directly from the sintering step, but they must not be allowed to cool. Consolidation at 34, takes place at elevated temperatures and pressures. The preform object is placed in the proper alignment in the preheated carbonaceous grain 22 which is contained in a simple die cavity 24a. The grain is heated at 37 to the same or slightly higher temperature as the preform, and acts as a thermal insulating barrier maintaining the preform temperature at the desired level. See FIG. 2. Also, the object is protected from oxidation by being within the carbonaceous grain.

The grain is pressurized by the downward motion of a punch 28 transfers the pressure to the object 20, consolidating it to full density. For most materials, consolidation pressures are from 20 to 60 tons per square inch. After densification, the preform can be readily separated at 35 from the carbonaceous grain, which is recycled hot, as indicated at 35a to conserve energy. Only a very small amount of grain, about one or two particle layers thick, remains on the consolidated object, and this is readily removed by any conventional cleaning method such as grit blasting, abrasive tumbling, brushing, etc. The consolidated object is usually left in the grain to cool to a temperature low enough that oxidation will be minimized.

As discussed previously, objects consolidated in 100% ceramic grain have at times suffered from distortion, since the ceramic grain did not distribute and transmit the applied pressure in a uniform manner. Likewise, objects consolidated in a hard, spherical graphitic particulate material at times exhibited upsetting with substantial axial compression on the order of 30 to 40% of the original dimension, for objects with a preform density of 80%. This large amount of deformation made it difficult to predict the preform shape required to obtain a near net shape final consolidated object.

It is found, however, that the use of substantially spherical carbonaceous grain particles (not graphitic) results in the production, of an unusually high degree of product dimensional stability which offers an improvement over graphitic particulate material. In addition, less axial compression and lateral expansion of objects are experienced with the use of grain consisting of low temperature, fluidized petroleum coke, thereby simplifying the design of preforms, which leads to near net shape final conslidated objects. The compressive stress-strain curves exhibited in FIG. 10 provide the reason for this beahvior. Graphitic particulates, curve (4), exhibit substantially more strain or compressibility than do the carbon particulate, curve (2). Both are spherical, and both have very similar shapes and appearance; i.e. both exhibit spherically shaped nodules on the surface and surface fissures, although thegraphitic particulate exhibits more of both features. The ceramic particulate has much less compressibility than both of the above as is indicated in curve (1). This is due to the fact that it bridges and consolidates and is not very elastic. Likewise, the ceramic grain would require larger stresses (pressures) to achieve a given level of densification. Th carbon particulate would require intermediate pressures 10 to 20% higher than the graphitic particulate.

In attempts to develop intermediate strains in previous grains, mixtures of ceramic and graphitic grains were blended together as indicated in curve (3) FIG. 10. Heating and mixing of these intermdiate strain mixtures are however very difficult due to the differences in specific gravity of the grain particles. That is, the blended mixture would separate during fluidized heating with the lighter graphitic grain rising to the surface. Heating of the mixture without fluidization is required, but recycling and reclaiming is still a difficult problem. The carbon grain represented by curve (2) and utilized in the present invention solves both of these problems.

Figure 12:
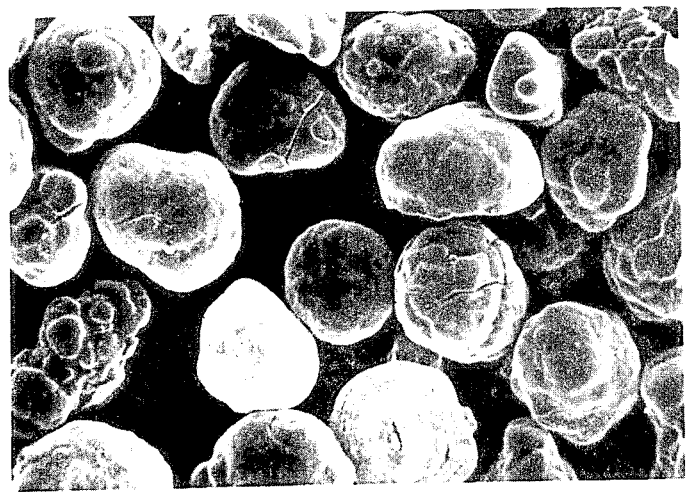
FIGS. 12 and 13 are photographic enlargement of carbonaceous bed particles.
Figure 13:
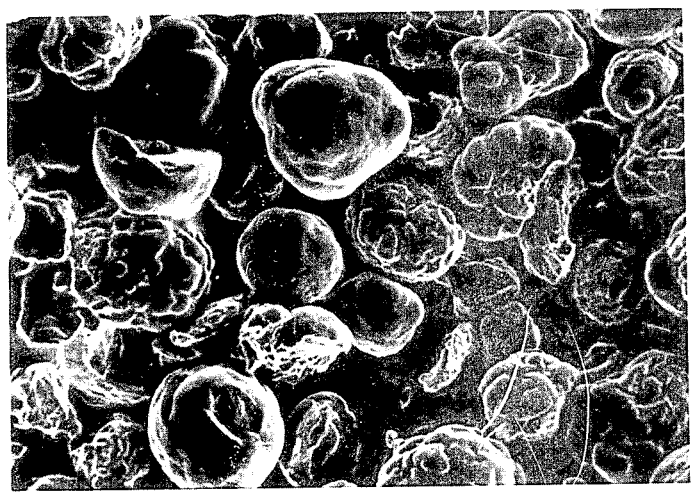

FIGS. 12 and 13 indicate the shape and characteristics of the carbon particulate or fluidized petroleum coke grain. Additional features of this material are:

(a) The carbon particulate material is inexpensive.

(b) The material has a typical size range of between about 50 and 325 mesh.

(c) The particulate material may be readily heated and is able to withstand temperatures up to 4000° F. and pressures of 10 to 120 TSI without excessive deterioration; (see FIG. 15).

(d) The carbon particulate tends to separate easily from the object consoliated, and does not agglomerate, which makes it readily recyclable.

(e) The carbon particulate is not as abrasive as the ceramic or graphitic particulate, and therefore reduced scoring and wear are achieved.

(f) The carbon particles have excellent flowability and fill around the object being consolidated. Objects can be pressed into the carbon particulate with minimal pressure which is an advantage for robotic handling and placement.

(g) The carbon particulate form and flow easily around edges when under pressure and distribute the applied pressure rather evenly over the object being consolidated.

(h) Carbon particulate is not as compressible as graphite particulate, which leads to less deformation and minimum distortion for the object being consolidated.

(i) The carbon particulate exhibits a compressibility that was only obtainable with mixtures of graphitic and ceramic grain.

A summary of the advantages of the process is as follows:

A. The process enables consolidation of objects consisting of powdered metals, ceramics, composites of similar or dissimilar powdered metals, composites of powdered metals and ceramics, composites of wrought or cast material, and any of the above, to full density.

B. The process provides improvements over methods described in U.S. Pat. Nos. 3,356,496; 3,689,259; 4,501,718 and 4,499,049.

C. A bed of flowable carbonaceous particles is provided to act as an effective pressure transmitting media to the object, thereby compacting the object into the desired shape and full (100%) theoretical density.

D. The process provides for use of a readily reusable (recyclable) particulate media able to withstand compression at relatively high temperatures (1500° F. to 3400° F.) and pressures (10 to 120 tons per square inch) without consolidation or agglomeration.

E. Recognition is given to use advantages of a sperical carbonaceous material whose elastic properties under the consolidation pressures and temperatures are such that the compressive strain of the material under pressure in a contained die is greatly reduced when compared with graphitic particulate and thus provides higher resistance to lateral flow for the powdered objects being consolidated.

F. A bed of flowable particles is provided within a contained die, the particulate primarily including flowable and resiliently compressible carbonaceous particles. The particulate flows and moves around an object pressed into it thus allowing for the insertion of objects, robotically, for enhanced production rates.

G. The method enables consolidation of powder metal objects of 60 to 95 percent of theoretical density to full (100%) density, whereby the absolute value of the axial strain is substantially larger than the lateral strain.

H. The method enables consolidation of powdered metal objects of 60 to 95% of theoretical density to full (100%) theoretical density, whereby the value of the axial compressive strain is −0.20 to −0.30 and the lateral strain is 0.01 to 0.05.

I. The method enables consolidation of powder metal objects of 60 to 95% of theoretical density, whereby the vertical surfaces of the objects remain essentially vertical and straight after consolidation.

J. Use is made of a relatively inexpensive particulate carbonaceous grain material that is readily available.

K. Use is made of a spherical particulate carbonaceous grain material that can be mixed with ceramic or graphitic particualte material to affect the compressibility of each in a controllable manner so as to effect the deformation and resultant. shape of consolidated objects.

L. Use is made of a spherical particulate carbonaceous grain material as a pressure transmitting media to consolidate a porous powder metal object to full density, whereby when the object is removed from the media, the particulate material readily falls off of the object to allow for easy cleaning. The consolidated object can easily be cleaned by either grit blasting or conventional mechanical cleaning methods . The resultant surface finish of the consolidated object is improved over objects forged in ceramic or graphite particulate media.

M. The spherical particulate carbonaceous grain material used as a pressure transmitting media has a size range of about 50 and about 325 mesh.

N. The method achieves, near net shape articles by minimizing deformation during consolidation of powdered metal or ceramic preforms whereby prediction of the preform shape is simplified.

A primary advantage of powdered metal object manufacturing methods is their ability to produce near net shaped objects. This allows for elimination of machining and other finishing operations and therefore lower manufacturing costs. A disadvantage of conventional powder metal object is that less than fullY dense objects occur, and have poor properties when compared with wrought material counterparts.

The present new method of consolidating porous powdered metal objects to full density utilizing carbon particulate grain enables objects to be produced to near net shape, more consistently.

Figure 14:
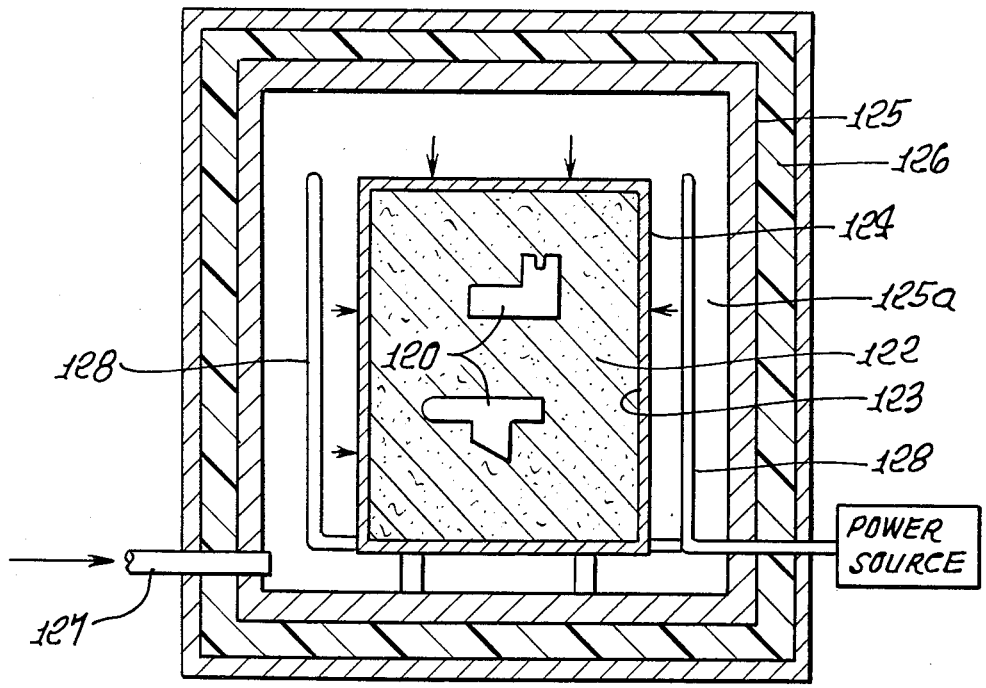
FIG. 14 is an elevation, in section, showing another method of consolidation.

Referring now to FIG. 14, the preform 120 is shown completely embedded in a bed 122 of carbonaceous or graphitic particles as described and which in turn have been placed or confined in a contained or confined zone 123, as in a deformable container 124, which may be thin-walled, and metallic. The latter is in turn located within a zone or space 125a within a chamber 125, such as an autoclave, suitably insulated at 126. Pressurized fluid, such as a gas, is admitted to the zone 125a, as via porting 127. A radiant heater, such as a Cal rod or rods 128 in space 125a heats the container which in turn transfer heat to the bed 122, raising its temperature and that of the object 120 to between 1,200° F. and 3,400° F., as referred to above in connection with FIG. 2.

As the fluid pressure in space 125a is raised, the container 124 is inwardly deformed or crushed by fluid pressure exertion against its walls, whereby the particles in the bed 122 are pressurized to a pressure of 5 to 25 TSI, this pressure being transferred by the flowable particles to the preform 120, and the powdered metal preform 120 (corresponding to object 20 in FIG. 2) is consolidated to full density.

Thereafter, the deformed container 124 is removed from the chamber 125, and opened, and the carbonaceous grain falls away from the consolidated object 120, leaving it exposed for further processing. In the above, the particulate most advantageously consists of petroleum coke particles, but may consist of graphitic particles.

The above processing is capable of achieving object tolerance to within about 0.004 inch, which eliminates the necessity for costly machining steps for many metallic articles. The consolidated article may then be heat treated, and ground to final dimensions.

We claim:

1. The method of consolidating a metallic, metallic and ceramic, or ceramic body in any of initially powdered, sintered, fibrous, sponge, or other form capable of compaction, that includes the steps:

(a) providing a bed of flowable particles within a contained zone, said particulate primarily consisting of flowable and resiliently compressible carbonaceous particles, in the form of beads having outwardly projecting nodules thereon, and at least some beads having surface fissures, (b) positioning said body in said bed, (c) and effecting pressurization of said bed to cause pressure transmission via said particles to said body, thereby to compact the body into desired shape, increasing its density, (d) said body and bed being at elevated temperatures prior to said pressurization step.

2. The method of claim 1 wherein said particles are generally spheroidal and consist of graphite.

3. The method of claim 1 including preheating both the body and bed prior to said pressurization step.

4. The method of claim 1 wherein said body in said bed, prior to said compaction, is at a temperature between about 1000° F. and 4000° F.

5. The method of claim 4 wherein said body is positioned in said bed to be surrounded by said particulate.

6. The method of any one of claims 1 and 2-5 wherein said pressurization is carried out to compress the particulate closest to the body, so that when the compacted body is removed from said bed, the particulate close to the body flows off the body.

7. The method of claim 1 wherein said bed contains sufficient of said flowable carbonaceous particles as to remain essentially free of agglomeration during said (c) step.

8. The method of claim 7, wherein said bed consists essentially of all graphite particles.

9. The method of claim 1, wherein said body is on a carrier which is also positioned in said bed.

10. The method of claim 9, wherein said body consists of a metal layer on said carrier.

11. The method of claim 10, wherein said metal layer consists essentially of tungsten.

12. The method of claim 11, wherein said carrier consists essentially of molybdenum, and said tungsten layer has annular shape on the carrier.

13. The method of any one of claims 1 and 2-5 and 7-12 wherein the particle mesh size is between 50 and 325.

14. The method of on of claims 2, and 8, wherein a substantial number of said particles contain fissures.

15. The consolidated body produced by the method of any one of claims 1, 2-5, 7-12 and 14.

16. The method of one of claims 1 and 2-5 wherein said particulate also includes ceramic particles admixed with said carbonaceous particles.

17. The method of one of claims 1 and 2-5 wherein said particulate also includes ceramic particles admixed with said carbonaceous particles, all of said particles having a mesh size between 50 and 325.

18. The method of claim 1 including subsequently employing said particulate in the consolidation of another compactable body, by steps corresponding to steps (a), (b), and (c) of claim 1.

19. The method of claim 1 including pre-heating the body to a temperature above at least about 1000° F., prior to said (c) step.

20. The method of claim 1 including preheating the particles that are located closest to the body in the bed, to a temperature above at least about 1000° F., prior to said (c) step.

21. The method of claim 20 wherein said particles consist of coke particles.

22. The method of claim 20 including also employing ceramic particles in the bed.

23. The method of claim 22 wherein said ceramic particles are mixed with said carbonaceous particles.

24. The method of claim 1 including sintering said object at between 1,700° F. and 3,400° F., prior to said (b) step.

25. The method of claim 1 wherein said (b) step is carried out by pressurizing said body downwardly into said bed, and allowing the bed particles to flow around said body.

26. The method of claim 1 wherein said pressurization of the bed is carried out at pressures between 10 and 120 tons per square inch.

27. The method of claim 26, wherein said body consists essentially of powdered metal and is compacted between 60% and 95% of full theoretical density by said (c) step.

28. The product produced by the method of any one of claims 21, 22 and 24-27.

29. The method of claim 1 including confining said bed and said body in a container, said (c) step including exerting pressure on the container to constrict same, thereby pressurizing said bed.

30. The method of claim 29 wherein fluid pressure is exerted on the container.

31. The method of claim 30 including providing a chamber within which said container is located, and wherein said fluid pressure is exerted on the container.

32. The method of claim 31 including heating the container and the particulate therein, within the chamber.

33. The method of claim 30 wherein said pressurized fluid is a pressurized gas.

34. The method of claim 32 wherein the particulate heated to between 1,200° F. and 3,400° F.

35. The method of claim 31 wherein the particulate is pressurized to between 5 and 25 tons per square inch.

36. The consolidated product produced by the method of any one of claims 29-35.

37. The method of claim 1 including the step of allowing the particles to flow off and away from the consolidated body after said pressurization step.

* * * * *